United States Patent [19]

Golley

[11] Patent Number: 5,084,254
[45] Date of Patent: Jan. 28, 1992

[54] NATURAL CALCIUM CARBONATE ORES

[75] Inventor: Christopher R. L. Golley, Austell, Great Britain

[73] Assignee: ECC International Limited, United Kingdom

[21] Appl. No.: 602,044

[22] Filed: Oct. 22, 1990

Related U.S. Application Data

[63] Continuation of Ser. No. 517,554, Apr. 24, 1990, abandoned, which is a continuation of Ser. No. 192,393, May 10, 1988, abandoned.

[30] Foreign Application Priority Data

May 11, 1987 [GB] United Kingdom ............... 8711094

[51] Int. Cl.$^5$ .................... C01F 11/06; B03D 1/06
[52] U.S. Cl. ................... 423/173; 423/166; 423/430; 23/304; 106/464; 209/166; 209/167; 241/16; 241/24
[58] Field of Search ............ 423/173, 430, 166; 209/166, 167, 2; 106/464, 465; 23/304; 241/16, 24

[56] References Cited

U.S. PATENT DOCUMENTS

| | | | |
|---|---|---|---|
| 3,960,715 | 6/1976 | Dicks et al. | 209/166 |
| 3,989,195 | 11/1976 | Falcon et al. | 106/464 |
| 4,165,840 | 8/1979 | Lewis et al. | 209/166 |
| 4,174,274 | 11/1979 | Tolley et al. | 209/166 |
| 4,293,097 | 10/1981 | Lewis et al. | 209/166 |
| 4,436,616 | 3/1984 | Du Four et al. | 209/167 |
| 4,486,301 | 12/1984 | Hsien et al. | 209/166 |
| 4,492,628 | 1/1985 | Young et al. | 209/166 |
| 4,504,092 | 3/1985 | Bichara et al. | 209/166 |
| 4,509,987 | 4/1985 | Farrar et al. | 106/465 |
| 4,732,669 | 3/1988 | Nimerick | 209/166 |
| 4,793,985 | 12/1988 | Price | 106/465 |

*Primary Examiner*—Gary P. Straub
*Attorney, Agent, or Firm*—Klauber & Jackson

[57] ABSTRACT

There is disclosed a process for purifying a calcium carbonate-containing mineral which process comprises the following steps:

a) mixing the calcium carbonate-containing mineral with water and a dispersing agent to form a suspension containing from 60% to 80% by weight of the dry mineral;

b) comminuting the suspension of calcium carbonate-containing mineral prepared in step a) to give a product containing not more than 5% by weight of particles which are retained on a sieve having a nominal aperture of 53 microns and not more than 50% by weight of particles which are smaller than 2 microns e.s.d.;

c) subjecting the suspension containing from 60% to 80% by weight of the dry comminuted mineral prepared in step b) to froth flotation using a collector for discoloring impurities which colletor comprises a cation containing at least one long chain alkyl group having from 10 to 24 carbon atoms, to yield an underflow product containing the calcium carbonate-containing mineral from which substantially all discoloring impurities have been removed; and d) further comminuting the underflow product of step c) to give a material of which at least 40% by weight of the particles have an equivalent spherical diameter smaller than 2 microns.

5 Claims, No Drawings

NATURAL CALCIUM CARBONATE ORES

This is a continuation of application Ser. No. 07/517,554, filed Apr. 24, 1990, now abandoned, which is a continuation of application Ser. No. 07/192,393, filed May 10, 1988, now abandoned.

This invention relates to a process for purifying natural calcium carbonate ores, for example chalk, marble or limestone, and more particularly to a process for removing from such an ore discolouring impurities, such as graphite, bituminous organic materials, iron compounds such as pyrites and other iron-stained minerals, which discolouring impurities impair the brightness and whiteness of a calcium carbonate product which is prepared from the ore.

It is known to use the technique of froth flotation for purifying calcium carbonate ores. The basic froth flotation operation is described, for example, in Section 12 of the "Handbook of Mineral Dressing" by A. F. Taggart, published by John Wiley & Sons, Inc. New York, 1945. The operation of froth flotation comprises the steps of grinding the ore in water to a maximum size of 35 or 48 mesh ASTM Standard Sieve and diluting the suspension of ground material to a pulp consistency containing from 15 to 35% by weight of solids before adding the froth flotation reagents. The importance of pulp density, or consistency, is also discussed on pages 12-98 and 12-99 of the same book. The pulp density is usually in the range of from 15% to 50% by weight solids and in exceptional cases, where the feed is a sulphide of a heavy metal, the pulp density may be as high as 75% by weight solids. However, the optimum pulp density for normally ground pulps is said to lie in the range from 25% to 30% by 30 weight of solids.

Brtish Patent Specification No. 1,519,528 describes a process for brightening and purifying a natural calcitic ore in which the ore is milled until at least 70 percent by weight of the particles are smaller than 2 microns equivalent spherical diameter (e.s.d.) and the milled product is subjected to a wet magnetic separation in a high intensity magnetic field, the wet magnetic separation preferably being preceded by a froth flotation carried out on the product milled so as to contain at least 70 percent by weight of particles smaller than 2 microns e.s.d. and using as collector potassium ethyl xanthate. The best results with this known process were obtained when the solids contents of the suspension used in the froth flotation and in the wet magnetic separation were both below 40% by weight.

According to a first aspect of the present invention there is provided a process for purifying a calcium carbonate-containing mineral which process comprises the following steps:

(a) mixing the calcium carbonate-containing mineral with water and a dispersing agent to form a suspension containing from 60% to 80% by weight of the dry mineral;

(b) comminuting the suspension of calcium carbonate-containing mineral prepared in step a) to give a product containing not more than 5% by weight of particles which are retainable on a sieve having a nominal aperture of 53 microns and not more than 50% by weight of particles which are smaller than 2 microns e.s.d.;

(c) subjecting the suspension containing from 60% to 80% by weight of the dry comminuted mineral prepared in step b) to froth flotation using a collector for discloring impurities which collector comprises a cation containing at least one long chain alkyl group having from 10 to 24 carbon atoms, to yield an underflow product containing the calcium carbonate-containing mineral from which substantially all discolouring impurities have been removed; and (d) further comminuting the underflow product of step( c) to give a material of which at least 40% by weight of the particles have an equivalent spherical diameter smaller than 2 microns.

According to a second aspect of the present invention there is provided a purified calcium carbonate-containing mineral whenever produced by a process according to the first aspect of this invention.

A purified calcium carbonate-containing mineral comprising from 40% to 60% by weight of particles having an equivalent spherical diameter (e.s.d.) smaller than 2 microns is considered suitable for use as a paper filler. A purified calcium carbonate containing mineral comprising from 60% to 100% by weight of particles having an e.s.d. smaller than 2 microns is considered suitable for use as a pigment for paper coating compositions,, as a filler for rubber and plastics compositions or as an extender for emulsion paints.

It has hitherto been a disadvantage of the froth flotation technique, when used for purifying calcium carbonate-containing minerals, that it has been considered necessary to dilute an aqueous suspension of the mineral to a solids content of less than 40% by weight if an efficient separation of impurities from the mineral is to be achieved by froth flotation alone. Since the calcium carbonate-containing mineral is mined in a substantially dry state, this has meant that a considerable quantity of water has had to be mixed with the mineral, and subsequently removed by an expensive mechanical or thermal dewatering operation before the calcium carbonate product can be sold.

We have now made the unexpected and surprising discovery that the technique of froth flotation can be used to perform an efficient separation of discolouring impurities from calcium carbonate-containing minerals at solids contents in the range from 60% to about 80% by weight of dry solids, the latter figure being the effective upper limit for the solids content since suspensions with solids contents above this level become insufficiently fluid to handle.

In step (a) of the process of the present invention the dispersing agent is advantageously an alkali metal or ammonium salt of a poly(acrylic acid) or a poly(methacrylic acid) having a number average molecular weight not greater than 10,000. The quantity of such a dispersing agent required is generally in the range from 0.05 to 1% by weight, based on the weight of dry calcium carbonate-containing mineral.

In step (b) of the process of the present invention the aqueous suspension, or slurry, of the calcium carbonate-containing mineral is preferably comminuted until substantially all of the particles are capable of passing through a sieve with a nominal aperture of 53 microns but not more than 35 percent by weight thereof are smaller than 2 microns e.s.d..

In step c) of the process of the present invention the suspension of comminuted calcium carbonate-containing mineral is preferably introduced into a froth flotation cell and, with the air inlets open, is conditioned with a frother for a time in the range of from 5 to 90 minutes. After this the collector for the discolouring impurities is added and the suspension preferably subjected to further agitation for a period of from 30 to 200 minutes. The frother may conveniently comprise one or more polypropylene glycol methyl ethers and the amount thereof used is preferably in the range from 5 to 100 ppm (parts by weight per million parts by weight of dry mineral). The collector for the discolouring impurities should comprise a cation containing at least one long chain alkyl group having from 10 to 24 carbon atoms; and especially preferred are amines and quaternary ammonium compounds containing at least one long chain alkyl group as defined above in which advantageously the amine or quaternary ammonium compound has been substantially completely neutralized with acetic acid. The amount of collector used is preferably in the range from 100 to 1,000 ppm. With certain raw calcium carbonate-containing minerals it is sometimes advantageous to add with the frother an oxidizing agent which is conveniently hydrogen peroxide. The amount of oxidizing agent added is advantageously in the range of from 50 to 10,000 ppm.

In step (d) of the process of the invention the underflow of step (c) is preferably comminuted to give a material of which at least 60% by weight of the particles have an equivalent spherical diameter smaller than 2 microns.

The invention is further illustrated by the following Examples.

EXAMPLE 1

Lumps of crushed marble of size up to about 20 mm were subjected to wet, autogenous grinding in the presence of 0.4% by weight, based on the weight of dry marble, of a sodium polyacrylate dispersing agent having a number average molecular weight of 1680 to produce a suspension containing 75% by weight of comminuted marble particles substantially all of which were smaller than 53 microns and 27 percent by weight of which consisted of particles smaller than 2 microns e.s.d..

Samples of this suspension were subjected to froth flotation in a laboratory flotation cell of square horizontal cross section of side 150 mm. Froth flotation separations were performed respectively with samples of suspension having solids contents of 75%, 70%, 33% and 22% by weight, the samples being diluted where necessary with water.

In each experiment there was first added 10 ml of a 1% by weight solution of a frother which consisted of a mixture of polypropylene glycol methyl ethers together with, in most cases, a quantity of hydrogen peroxide. The mixture was then subjected to agitation with the air inlets open for 5 minutes after which a collector which consisted of a 1% by weight solution of octadecenylamine neutralized with a stoichiometric quantity of acetic acid was added in increments of 10 ml. After each incremental addition the froth was monitored visually and when no more coloured material could be seen the floatation was stopped and the total chemical addition recorded. The percentage by weight of the original mineral which was recovered in the underflow product was also determined. In the experiments in which the samples of suspension had solids contents of 22% and 33% by weight the underflow product was collected, flocculated with calcium chloride solution, filtered, dried and weighed. A portion of the dried product was then resuspended in water containing 0.7% by weight, based on the weight of dry marble product, of the same dispersing agent as was described above to form a suspension containing 70% by weight of dry marble.

In the experiments in which the samples of suspension had solids contents of 70% and 75% by weight the underflow product was collected and there was mixed therewith 0.3% by weight, based on the weight of dry marble product, of the same dispersing agent.

In all cases the final suspension containing 70-75% by weight of dry marble was subjected to comminution by agitation with a particulate grinding medium which consisted of grains of silica sand of size 0.5 to 1 mm. Samples of the suspension were withdrawn at intervals and measurements were made of the percentage by weight of the particles in the sample which had an equivalent spherical diameter smaller than 2 microns and of the reflectance of the powdered dried component of the samples to visible light of wavelengths 457 and 570 nm. By interpolation the reflectance values were determined for comminuted samples which contained 75%, 90% and 95% by weight respectively of particles having an equivalent spherical diameter smaller than 2 microns.

Samples of the original suspensions before treatment by froth flotation were also taken and subjected to the comminution and measurement procedure described above.

The results obtained are set forth in Table 1 below:

TABLE I

| | | | | | % by wt smaller then 2 um | | | | | |
|---|---|---|---|---|---|---|---|---|---|---|
| % by | quantity (ppm) of | | | % by | 75 | | 90 | | 95 | |
| wt of | | hydrogen | | weight | % reflectance to light of wavelength | | | | | |
| solids | frother | peroxide | collector | recovery | 457 nm | 570 nm | 457 nm | 750 nm | 457 nm | 570 nm |
| 22 | — | — | — | — | 93.5 | 95.0 | 93.1 | 94.3 | 93.0 | 94.2 |
| 22 | 52 | 9500 | 528 | 97 | 95.0 | 96.7 | 95.1 | 96.8 | 95.1 | 96.8 |
| 22 | 57 | 0 | 572 | 96 | 94.8 | 96.5 | 94.3 | 96.2 | 94.1 | 96.0 |
| 33 | — | — | — | — | 92.4 | 93.4 | 91.8 | 92.8 | 91.6 | 92.6 |
| 33 | 29 | 1172 | 165 | 96 | 95.1 | 96.5 | 94.8 | 96.4 | 94.6 | 96.3 |
| 70 | — | — | — | — | 89.8 | 92.2 | 88.9 | 91.2 | 88.5 | 90.7 |
| 70 | 12 | 245 | 153 | 96 | 92.7 | 94.9 | 92.5 | 94.8 | 92.4 | 94.8 |
| 75 | — | — | — | — | 93.5 | 94.1 | 92.3 | 92.8 | 91.7 | 92.2 |
| 75 | 10 | 197 | 148 | 94 | 95.2 | 96.6 | 94.9 | 96.4 | 94.8 | 96.3 |

These results show that, surprisingly, the percentage by weight of the original material recovered in the underflow product and the increase in percentage reflectance to violet light of wavelength 457 nm are substantially the same whether the froth flotation is performed at a conventional low solids content or at a high solids content in accordance with the invention. A suspension of calcium carbonate-containing mineral subjected to froth flotation at 70% or 75% by weight of dry solids would need no dewatering to form a product which would be saleable in slurry form. It can also be seen that the addition of hydrogen peroxide results in a small, but significant, increase in reflectance to visible light.

EXAMPLE 2

Lumps of crushed marble of size up to about 20 mm were subjected to wet, autogenous grinding in the presence of 0.4% by weight, based on the weight of dry marble, of the same dispersing agent as was described in Example 1, to produce a suspension containing 75% by weight of comminuted marble particles substantially all of which were smaller than 53 microns and 27 percent by weight of which were smaller than 2 microns e.s.d..

Samples of this suspension were subjected to froth flotation in a pilot-scale flotation cell of square horizontal cross section of side 356 mm. In each experiment there was added first to the undiluted suspension in the flotation cell 30 ppm of the same frother as was used in Example 1, and in one of the two experiments 150 ppm of hydrogen peroxide was also added at this stage. The mixture was then subjected to agitation, with the air inlets open, for 5 minutes after which a succession of small additions of the same collector reagent as was used in Example 1 was made until the total quantity of collector added was 390 ppm. The total time for the flotation operation was 3 hours.

The underflow product from each experiment was treated with 0.3% by weight, based on the weight of dry calcium carbonate mineral, of the same dispersing agent as was described in Example 1, and subjected to comminution in the manner described in Example 1. Values of the percentage reflectance of the dry, powdered, ground material to light of wavelengths 457 and 570 nm for material comminuted to the extent that 75%, 90% and 95% by weight respectively consisted of particles having an equivalent spherical diameter smaller than 2 microns were estimated by the method described in Example 1.

A sample of the autogenously ground suspension before treatment by froth flotation was also subjected to the same comminution and measurement procedure as was described in Example 1.

The results obtained are set forth in Table II below:

TABLE II

| quantity (ppm) of | | | % by weight recovery | % by wt smaller than 2 μm | | | | | |
|---|---|---|---|---|---|---|---|---|---|
| | | | | 75 | | 90 | | 95 | |
| | | | | % reflectance to light of wavelength | | | | | |
| frother | hydrogen peroxide | collector | | 457 nm | 570 nm | 457 nm | 750 nm | 457 nm | 570 nm |
| — | — | — | — | 93.2 | 94.3 | 92.5 | 93.5 | 92.1 | 93.0 |
| 30 | 0 | 390 | 95 | 94.6 | 96.2 | 94.2 | 95.8 | 94.0 | 95.6 |
| 30 | 150 | 390 | 96 | 94.6 | 96.0 | 94.3 | 95.6 | 94.1 | 95.5 |

In this case it can be seen that the addition of hydrogen peroxide made no significant difference to the results obtained.

EXAMPLE 3

A sample of marble powder which had been dry milled to yield a product substantially all of which consisted of particles smaller than 53 microns and 8 percent by weight of which consisted of particles smaller than 2 microns e.s.d., was mixed with sufficient water to form a suspension containing 70% by weight of dry marble and 0.2% by weight, based on the weight of dry marble, of the same dispersing agent as was described in Example 1.

7 litre portions of this suspension were placed in a laboratory froth flotation cell of the type described in Example 1 and in each case 28 ppm of the same frother as was used in Example 1 was added. The mixture was agitated for 5 minutes, with the air inlets open, after which the same collector as was used in Example 1 was added at intervals in three increments each of 100 ppm. After each increment of collector had been added the underflow and froth products were sampled and tested for percentage by weight of acid-insoluble residue (i.e. non-carbonate material).

A second experiment was also performed in which the collector was added in two increments each of 150 ppm and the final percentages by weight of acid-insoluble residue were determined for the froth and underflow products.

As a comparison the percentage by weight of acid-insoluble residue was also determined for the dry ground mineral before treatment by froth flotation.

The results obtained are set forth in Table III below:

TABLE III

| | Collector dose (ppm) | % by weight recovery | % by weight acid insoluble residue | | |
|---|---|---|---|---|---|
| | | | underflow | froth | feed |
| Experiment 1 | 100 | 98.8 | 3.5 | 40.3 | 4.3 |
| | 200 | 95.3 | 2.0 | 45.8 | 4.3 |
| | 300 | 91.4 | 0.8 | 28.4 | 4.3 |
| Experiment 2 | 300 | 91.3 | 0.8 | 36.2 | 4.3 |

EXAMPLE 4

Samples of marble which had been comminuted to different degrees of fineness were subjected to froth flotation in the pilot-scale flotation cell which was described in Example 2.

The samples were:

(A) A further of the same autogenogously ground marble as was described in Example 2. 27 percent by weight of this material consisted of particles having an equivalent spherical diameter smaller than 2 μm.

(B) A sample of the same autogenously ground marble which had been subjected to a single stage of attrition grinding in an aqueous suspension containing 75 percent by weight of dry marble and 0.4 per cent by weight, based on the weight of dry marble, of the same dispersing agent as was described in Example 1. The grinding medium consisted of grains of silica sand ranging in size from 0.5 mm to 1.0 mm. 45 percent by weight of this comminuted marble consisted of particles having an equivalent spherical diameter smaller than 2.

(C). A sample of a commercial paper coating grade marble which had been prepared from raw crushed marble by wet autogenous grinding followed by two stages of wet attrition grinding. 95 percent by weight of this material consisted of particles having an equivalent spherical diameter smaller than 2 μm.

Each sample was subjected to froth flotation in the form of an aqueous suspension containing 75 percent by weight of dry comminuted marble and 0.4 percent by weight, based on the weight of dry marble, of the same dispersing agent as was described in Example 1. In each experiment there was added first to the suspension in the flotation cell 30 ppm., based on the weight of dry marble, of the same frother as was used in Example 1. The mixture was then subjected to agitation with the air inlets open for 5 minutes after which a succession of additives each of 50 ppm, based on the weight of dry marble, of the same collector reagent as was used in Example 1 was made until no disclouration could be detected visually in the froth product. At this point one further addition of 50 ppm of the collector reagent was made and the flotation was then terminated.

The underflow products from Experiments A and B were further comminuted by attrition grinding to give a final product 95 percent by weight of which consisted of particles having an equivalent spherical diameter smaller than 2 μm. Generally fine attrition grinding of a natural calcitic material containing dark coloured impurities causes a reduction in the percentage reflectance of visible light because finely divided impurity particles in total absorb more light than coarser impurity particles in total absorb more light than coarser impurity particles. All the feed and underflow product samples were then dewatered and dried and in each case the percentage reflectance of the dry powdered material to light of wavelengths 457 nm and 570 nm was measured by the procedure described in Example 1.

The results are set forth in Table IV below:

TABLE IV

| Experiment | % by wt. smaller than 2 μm in feed | % reflectance after grinding to 95% - 2 μm | | | |
|---|---|---|---|---|---|
| | | Feed | | Product | |
| | | 457 nm | 570 nm | 457 nm | 570 nm |
| A | 27 | 92.1 | 93.0 | 94.0 | 95.6 |
| B | 45 | 91.9 | 92.9 | 94.1 | 95.4 |
| C | 95 | 90.8 | 91.6 | 93.3 | 95.2 |

These results show that a small but significant improvement in the reflectance to violet light of wavelength 457 nm is obtained if the calcite sample is subjected to froth flotation in a state of division such that not more than 50 percent by weight of the material consists of particles having an equivalent spherical diameter smaller than 2 μm and the underflow product is then subjected to a final comminution step to achieve the desired degree of fineness for a paper coating grade material. If the froth flotation is performed on a calcite sample which has already been comminuted to 95 percent by weight smaller than 2 μm the reflectance to violet light is almost one percentage point lower, which difference is clearly visible to the eye.

What is claimed is:

1. In the process for purifying a calcium carbonate-containing mineral, which process comprises the following steps:
   (a) mixing the calcium carbonate-containing mineral with water and a dispersing agent to form a suspension of the dry mineral;
   (b) comminuting the suspension of calcium carbonate-containing mineral prepared in step (a) to give a product containing not more than 5% by weight of particles which are retained on a sieve having a nominal aperture of 53 microns and not more than 50% by weight of particles which are smaller than 2 microns e.s.d.;
   (c) subjecting the suspension prepared in step (b) to froth flotation using a collector for discolouring impurities, which collector comprises a cation containing at least one long chain alkyl group having from 10 to 24 carbon atoms, to yield an underflow product containing the calcium carbonate-containing mineral from which substantially all discolouring impurities have been removed; and
   (d) further comminuting the underflow product of step (c) to give a material of which at least 40% by weight of the particles have an equivalent spherical diameter smaller than 2 microns;
   the improvement comprising:
   forming said suspension in step (a) to contain from 60 to 80% by weight of said dry mineral; and subjecting said 60 to 80% mineral solids suspension to the comminution and froth flotation of steps (b) and (c) while maintaining the solids content at 60-80% by weight through steps (b) and (c).

2. In the process for purifying a calcium carbonate-containing mineral, which process comprises the following steps:
   (a) mixing the calcium carbonate-containing mineral with water and from 0.05 to 1% b weight of the dry calcium carbonate-containing mineral, of a dispersing agent which is an alkali metal or ammonium salt of a poly(acrylic acid) or a poly(methacrylic acid) having a number average molecular weight not greater than 10,000 to thereby form a suspension of the dry mineral;
   (b) comminuting the suspension of calcium carbonate-containing mineral prepared in step (a) to give a product containing not more than 5% by weight of particles which are retained on a sieve having a nominal aperture of 53 microns and not more than 50% by weight of particles which are smaller than 2 microns e.s.d.;
   (c) subjecting the suspension prepared in step (b) to froth flotation using a collector for discolouring impurities, which collector comprises a cation containing at least one long chain alkyl group having from 10 to 24 carbon atoms, to yield an underflow product containing the calcium carbonate-containing mineral from which substantially all discolouring impurities have been removed; and
   (d) further comminuting the underflow product of step (c) to give a material of which at least 40% by weight of the particles have an equivalent spherical diameter smaller than 2 microns;
   the improvement comprising:
   forming said suspension in step (a) to contain from 60 to 80% by weight of said dry mineral; and subjecting said 60 to 80% mineral solids suspension to the comminution and froth flotation of steps (b) and (c) while maintaining the solids content at 60-80% by weight through steps (b) and (c).

3. In the process for purifying a calcium carbonate-containing mineral, which process comprises the following steps:
   (a) mixing the calcium carbonate-containing mineral with water and a dispersing agent to form a suspension of the dry mineral;
   (b) comminuting the suspension of calcium carbonate-containing mineral prepared in step (a) to give a product containing not more than 5% by weight of particles which are retained on a sieve having a nominal aperture of 53 microns and not more than 50% by weight of particles which are smaller than 2 microns e.s.d.;
   (c) subjecting the suspension prepared in step (b) to froth flotation using a frother and a collector for discolouring impurities; the collector comprising a cation containing at least one long chain alkyl group having from 10 to 24 carbon atoms; and the frother comprising one or more polypropylene glycol methyl ethers and the amount thereof used is in the range of from 5 to 100 ppm (parts by weight per million parts by weight of dry mineral); said suspension of comminuted calcium carbonate-containing mineral being introduced into a froth flotation cell and, with the air inlets open, conditioned with said frother for a time in the range of from 5 to 90 minutes; and thereafter said collector for the discolouring impurities being added and the suspension subjected to further agitation for a period of from 30 to 200 minutes; to thereby yield an underflow product containing the calcium carbonate-containing mineral from which substantially all discolouring impurities have been removed; and (d) further comminuting the underflow product of step (c) to give a material of which at least 40% by weight of the particles have an equivalent spherical diameter smaller than 2 microns;

the improvement comprising:

forming said suspension in step (a) to contain from 60 to 80% by weight of said dry mineral; and subjecting said 60 to 80% mineral solids suspension to the communication and froth flotation of steps (b) and (c) while maintaining the solids content at 60–80% by weight through steps (b) and (c).

4. In the process for purifying a calcium carbonate-containing mineral, which process comprises the following steps:

(a) mixing the calcium carbonate-containing mineral with water and dispersing agent to form a suspension of the dry mineral;

(b) comminuting the suspension of calcium carbonate-containing mineral prepared in step (a) to give a product containing not more than 5% by weight of particles which are retained on a sieve having a nominal aperture of 53 microns and not more than 50% by weight of particles which are smaller than 2 micros e.s.d;

(c) subjecting the suspension prepared in step (b) to froth flotation using a collector for discolouring impurities, which collector comprises an amine or quaternary ammonium compound containing at least one long chain alkyl group having from 10 to 245 carbon atoms and wherein the amine or quaternary ammonium compound has been substantially completely neutralized with acetic acid; to thereby yield an underflow product containing the calcium carbonate-containing mineral from which substantially all discolouring impurities have been removed; and (d) further communicating the underflow product of step (c) to give a material or which at least 40% by weight of the particles have an equivalent spherical diameter smaller than 2 microns;

the improvement comprising forming said suspension in step (a) to contain from 60 to 80% by weight of said dry mineral; and subjecting said 60 to 80% mineral solids suspension to the comminution and froth flotation of steps (b) and (c) while maintaining the solids content at 60–80% by weight through steps (b) and (c).

5. In the process for purifying a calcium carbonate-containing mineral, which process comprises the following steps:

(a) mixing the calcium carbonate-containing mineral with water and a dispersing agent to form a suspension of the dry mineral;

(b) comminuting the suspension of calcium carbonate-containing mineral prepared in step (a) to give a product containing not more than 5% by weight of particles which are retained on a sieve having a nominal aperture of 53 microns and not more than 50% by weight of particles which are smaller than 2 microns e.s.d.;

(c) subjecting the suspension prepared in step (b) to froth flotation in the presence of an added oxidizing agent, using a collector for discolouring impurities, which collector comprises a cation containing at least one long chain alkyl group having from 10 to 24 carbon atoms, to yield an underflow product containing the calcium carbonate-containing mineral from which substantially all discolouring impurities have been removed; and (d) further comminuting the underflow product of step (c) to give a material of which at least 40% by weight of the particles have an equivalent spherical diameter smaller than 2 microns;

the improvement comprising:

forming said suspension in step (a) to contain from 60 to 80% by weight of said dry mineral; and subjecting said 60 to 80% mineral solids suspension to the comminution and froth flotation of steps (b) and (c) while maintaining the solids contents at 60–80% by weight through steps (b) and (c).

* * * * *